(No Model.)

J. FLINNER & J. HOLLINGER.
Vertically Swinging Gate.

No. 239,234. Patented March 22, 1881.

WITNESSES:
W. W. Hollingsworth
Edw. W. Byrn

INVENTOR:
J. Flinner
J. Hollinger
BY
ATTORNEYS.

UNITED STATES PATENT OFFICE.

JOHN FLINNER AND JACOB HOLLINGER, OF MILLERSBURG, OHIO.

VERTICALLY-SWINGING GATE.

SPECIFICATION forming part of Letters Patent No. 239,234, dated March 22, 1881.

Application filed November 6, 1880. (No model.)

*To all whom it may concern:*

Be it known that we, JOHN FLINNER and JACOB HOLLINGER, of Millersburg, in the county of Holmes and State of Ohio, have invented a new and Improved Vertically-Swinging Gate; and we do hereby declare that the following is a full, clear, and exact description of the same, reference being had to the accompanying drawings, forming part of this specification, in which—

Figure 1:
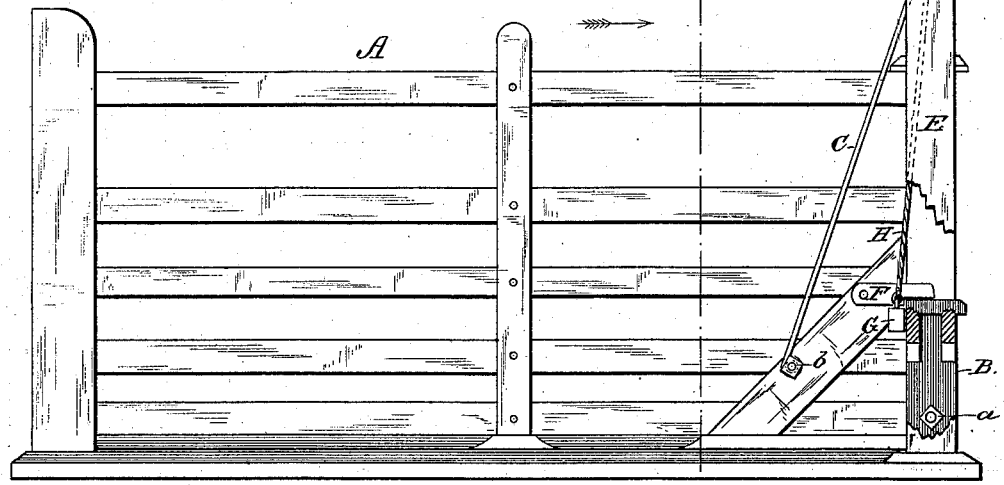
Figure 2:
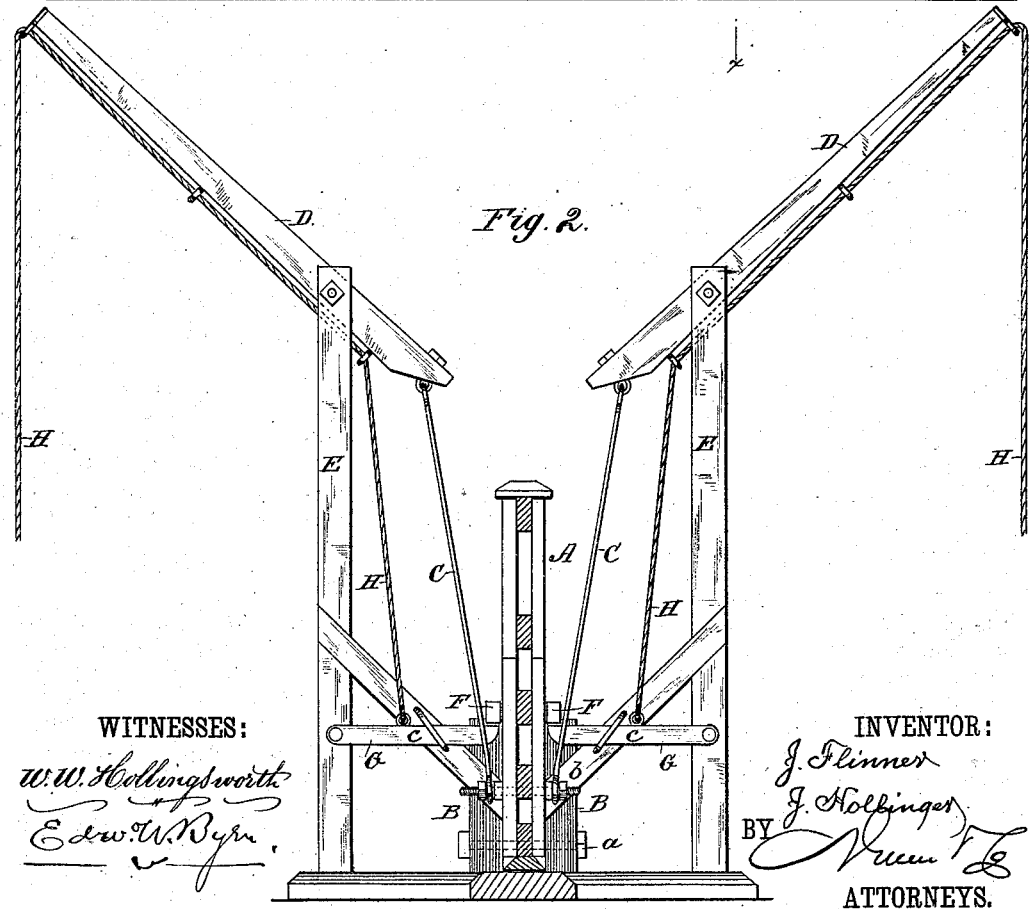

Figure 1 is a side elevation of the gate with the lever-post broken out at the bottom; and Fig. 2 is a vertical section through the line $x$ $x$ of Fig. 1, looking in the direction of the arrow.

In our application for a patent which was allowed August 16, 1880, we combined a vertically-swinging gate with a pair of short guide-posts, between which the gate was pivoted, and to which gate the lift-rods of a pair of levers were directly connected by a bolt, so that when the gate was raised the bolt or connection for the lift-rods passed over the top of the posts. In said case the only means shown for preventing the gate from being lifted by hogs was a row of points on the bottom bars for pricking the nose of such animals.

Our present invention consists in the peculiar combination and arrangement, with this gate and the short posts, of a locking mechanism for holding the gate down and preventing it from being raised, except when it is to be raised by the working-levers.

In the drawings, A represents the gate, which is pivoted at $a$ between two short posts B B, and has a diagonal brace in its lower inner corner, through which passes a threaded bolt, $b$, that is directly connected to the two lift-rods C C, attached at their upper ends to the levers D D, fulcrumed on posts E E, so that when the outer ends of said levers are pulled down the gate is raised into a vertical position and the connection $b$ is thrown over the short posts to the opposite side, all as fully described in our said prior application. To hold this gate down so that small stock cannot raise the same, we pivot to the gate, on a level with the top of the short posts B B, the latches F, one on each side, whose rabbeted ends abut against the tops of the posts B, (see Fig. 1,) and which, when occupying this position, prevent the gate from being raised on its pivot. To release this, when the gate is to be raised, a second latch, G, is fulcrumed to each of the taller posts E, which latches rest at right angles to the latches F on the gate and beneath the same. The movement of these latches G is limited by loop or keepers $c$, and said latches are raised to release the gate-latches F by cords H, which pass up to the main working-lever and run through loops or eyes to the outer ends of the same.

Now, when the gate is to be opened. a pull upon the ends of the cord H first lifts the latch G, and this in turn lifts the latch F to a position above the short posts; then the lever D commences to move and raises the gate through the lift-rods.

To cause both latches F F to be worked from either side of the gate, the axis of said latches is rigidly attached to the same, so that when one latch is raised the other moves with it.

We are aware that locking mechanisms have been combined with lever-raising devices before, and therefore only claim such locking mechanism in combination with the short posts, the gate, and operating mechanism shown.

Having thus described our invention, what we claim as new is—

The combination, with the gate and its lifting mechanism and the short posts B B, of the latches F F, engaging with the top of said short posts, and the lifting-latch G, arranged at right angles beneath the same, and connected by cords with the lifting-levers, as described.

JOHN FLINNER.
JACOB HOLLINGER.

Witnesses:
M. B. DE SILVA,
JOHN HOOVER.